April 23, 1968  W. J. VAN LIEW, JR  3,379,294
SERPENTINE CHUTE FOR CAN VENDER HAVING STRUCTURE
PREVENTING RIM INTERLOCK
Filed Jan. 26, 1967

INVENTOR
William James VanLiew Jr.

BY
Hovey, Schmidt, Johnson & Hovey
ATTORNEYS.

United States Patent Office 3,379,294
Patented Apr. 23, 1968

3,379,294
SERPENTINE CHUTE FOR CAN VENDER HAVING STRUCTURE PREVENTING RIM INTERLOCK
William James Van Liew, Jr., Kansas City, Mo., assignor to The Vendo Company, Kansas City, Mo., a corporation of Missouri
Filed Jan. 26, 1967, Ser. No. 611,934
3 Claims. (Cl. 193—2)

ABSTRACT OF THE DISCLOSURE

A raised bead on the surface of an article support ramp of a vending machine prevents jamming of canned products gravitating down the ramp. The bead is centered between the walls of the dispensing compartment and extends along the direction of inclination of the ramp in order to preclude interlocking of the rims of a sufficient number of cans to bridge between the walls by causing at least a pair of the cans tending to interlock rims to be tilted in opposite directions by the bead.

---

Canned beverages are becoming increasingly popular with the result that vending machines must now be capable of accommodating canned products which, manifestly, have an entirely different shape as compared with bottles. A problem is encountered in that the cylindrical can has a pair of opposed rims which may become interlocked with the rims of an adjacent can during gravitation of a row of cans down a chute to a customer access station in the machine. This problem is particularly acute in serpentine stack venders of the type disclosed in the U.S. patent application of Elmer C. Johnson, Ser. No. 506,637, now Patent No. 3,348,733, filed Nov. 8, 1965, and entitled "Serpentine Stack Article Dispensing Machine," owned by the assignee herein.

In a serpentine stack can vender the canned products gravitate down vertically spaced ramps between the walls of the dispensing compartment. The spacing between the walls is such that sufficient clearance is provided for the free passage of the cans. However, occasionally a series of cans assume positions with the rims of adjacent cans interlocked, resulting in the formation of a series of interlocked cans capable of bridging the walls and contacting the latter with sufficient friction to cause jamming.

It is, therefore, the primary object of this invention to provide a means of preventing jamming of cylindrical articles in a dispensing machine of the type where such articles gravitate along a ramp toward the customer access station.

As a corollary to the foregoing object, it is an important aim of the instant invention to prevent rim interlock of adjacent canned products to an extent which could cause bridging of the walls of the dispensing compartment and attendant jamming as aforesaid.

Figure 1:
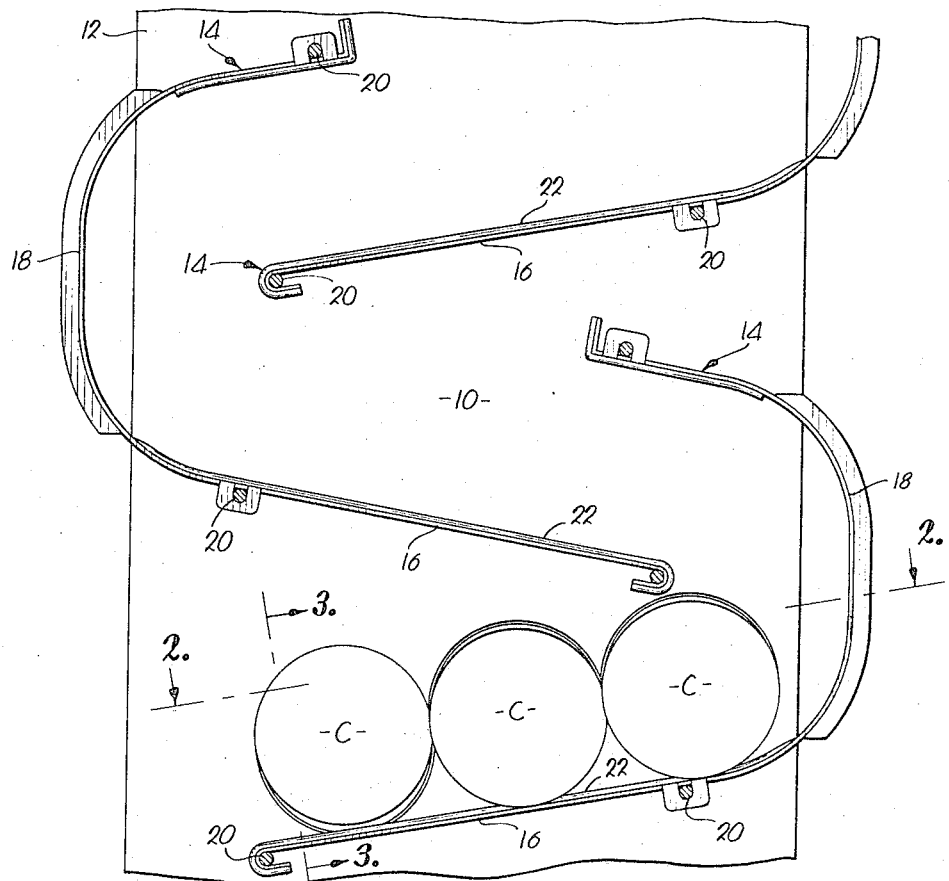
Figure 2:
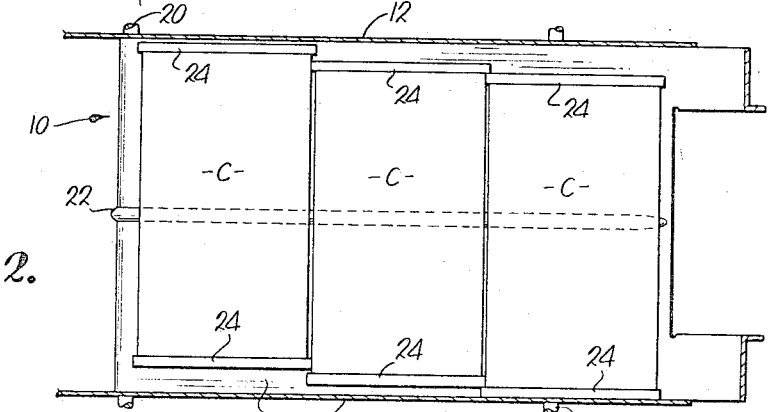
Figure 3:
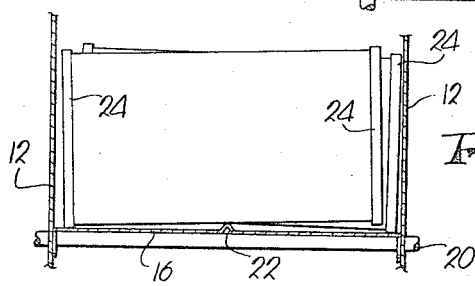

In the drawing:
FIGURE 1 is a fragmentary, side elevational view of a dispensing compartment of a serpentine stack vender, one wall of the compartment being removed to reveal the interior construction;
FIG. 2 is a sectional view taken along line 2—2 of FIG. 1; and
FIG. 3 is a sectional view taken along line 3—3 of FIG. 1.

A portion of a dispensing compartment of a serpentine stack can vender is broadly denoted by the numeral 10 and comprises a chute which houses the canned products and feeds the latter downwardly by gravity to a customer access station, delivery of individual products to the customer being controlled by a mechanism not illustrated in the figures. Compartment 10 includes a pair of opposed, vertical walls 12 and a number of elongated, J-shaped sheet metal components 14 of identical configuration. Each component 14 forms an elongated, straight ramp 16 and a curved guide member 18, the latter defining an inwardly facing concavity. Components 14 are mounted between walls 12 by a plurality of horizontal rods 20 extending across the space between walls 12.

As is clear in FIG. 1, the mounting of components 14 between walls 12 is such that ramps 16 are disposed in vertically spaced relationship to one another with adjacent ramps inclined in opposite directions. The ramp 16 of a particular component 14 extends partially into the concavity formed by the guide member 18 of the next component 14 therebelow. A row of cans C are shown resting on the upper surface of the lowermost ramp 16 illustrated, it being understood that, when compartment 10 is fully loaded, the cans will form a serpentine stack and be guided from ramp to ramp during dispensing of successive cans by the curved guide members 18.

An elongated, raised bead 22 extends in the direction of inclination of each ramp 16 and projects upwardly out of the plane of the article-supporting surface thereof. Each bead 22 forms a projection or ridge having a vertical dimension greater than the thickness of the rims 24 of cans C. Thus, both of the rims 24 of each can C cannot contact the upper surface of ramp 16 simultaneously, with the result that the cans must gravitate along the ramps with only one rim of each can in rolling contact therewith.

The effect of bead 22 is best illustrated in FIG. 3 where it may be seen that the can C closest to the viewer has its left rim 24 in contact with the underlying ramp 16. The adjacent can therebehind, however, has its right-hand rim 24 in contact with ramp 16. Thus, the adjacent pair of cans shown in FIG. 3 tilt in opposite directions by virtue of the fact that the center of gravity of the front can is on the left side or bead 22, while the center of gravity of the rear can is on the right side of bead 22. This is also depicted in FIG. 2 where a greater space is illustrated between corresponding rims of the left-hand can and the center can, the latter and the right-hand can having their rims interlocked since both of these cans have their centers of gravity on the same side of bead 22. However, the particular spacing illustrated between walls 12 renders the interlocking of two cans incapable of bridging the walls and causing a jam; but, if it were not for bead 22, the addition of two more interlocked cans to the two interlocked cans of FIG. 2 would form a series of four interlocked cans having a total width sufficient to bridge the walls and frictionally engage the latter. This could create a jam condition, but is precluded in the instant invention since the rims of the oppositely tilted cans are incapable of interlocking.

Having thus described the invention, what is claimed as new and desired to be secured by Letters Patent is:
1. In apparatus for dispensing a cylindrical article of predetermined length having a pair of opposed rims, the combination with a row of said articles of:
    a pair of opposed walls spaced apart a distance greater than the total of said length plus the width of one of said rims;
    a ramp extending downwardly between said walls and supporting said row of articles for gravitational movement in unison down the ramp with the rims of each article adjacent respective walls; and
    a ridge on said ramp extending in the direction of inclination thereof, substantially centrally disposed between said walls, and having a height greater than the thickness of said rims to engage each article and prevent simultaneous contact of both rims thereof with the ramp, whereby to inhibit accumulative interlocking of the rims of a sufficient number of adjacent articles by opposite tilting of a pair thereof to preclude jamming of the articles between the walls.

2. The invention of claim 1,
said ramp having an article-receiving upper surface,
said ridge comprising a raised bead projecting upwardly out of the plane of said surface.

3. The invention of claim 1,
there being a plurality of said ramps and structure mounting the ramps in vertically spaced relationship with adjacent ramps inclined in opposite directions; and
a curved guide member extending upwardly from the top of each of said ramps respectively and defining an inwardly facing concavity,
said members being disposed to receive and transfer gravitating articles from ramp to ramp, whereby a plurality of rows of articles are supported in a serpentine stack configuration,
there being a plurality of said ridges on respective ramps.

References Cited

UNITED STATES PATENTS

| | | | |
|---|---|---|---|
| 1,004,998 | 10/1911 | Crecelius. | |
| 1,733,662 | 10/1929 | Gumaer | 193—41 |
| 2,210,653 | 8/1940 | Dennis | 193—27 |
| 2,218,444 | 10/1940 | Vineyard | 193—2 X |
| 2,279,093 | 4/1942 | Peters | 221—129 X |
| 2,304,455 | 12/1942 | Guerard. | |
| 2,427,958 | 9/1947 | Gibson et al. | 193—38 |

ANDRES H. NIELSEN, *Primary Examiner.*

EVON C. BLUNK, *Examiner.*

M. L. AJEMAN, *Assistant Examiner.*